United States Patent
Drerup et al.

(10) Patent No.: US 11,561,900 B1
(45) Date of Patent: Jan. 24, 2023

(54) TARGETING OF LATERAL CASTOUTS IN A DATA PROCESSING SYSTEM

(71) Applicant: INTERNATIONAL BUSINESS MACHINES CORPORATION, Armonk, NY (US)

(72) Inventors: Bernard C. Drerup, Austin, TX (US); Guy L. Guthrie, Austin, TX (US); Jeffrey A. Stuecheli, Austin, TX (US); Alexander Michael Taft, Austin, TX (US); Derek E. Williams, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/394,153

(22) Filed: Aug. 4, 2021

(51) Int. Cl.
*G06F 12/08* (2016.01)
*G06F 12/0811* (2016.01)
*G06F 12/0891* (2016.01)
*G06F 12/0888* (2016.01)

(52) U.S. Cl.
CPC ...... *G06F 12/0811* (2013.01); *G06F 12/0888* (2013.01); *G06F 12/0891* (2013.01)

(58) Field of Classification Search
CPC ............ G06F 12/0811; G06F 12/0888; G06F 12/0891
See application file for complete search history.

(56) References Cited

U.S. PATENT DOCUMENTS

| | | | |
|---|---|---|---|
| 7,827,354 B2 | 11/2010 | Clark et al. | |
| 8,725,950 B2 | 5/2014 | Vishin | |
| 9,753,862 B1* | 9/2017 | Drerup | G06F 12/0864 |
| 2011/0161588 A1* | 6/2011 | Guthrie | G06F 12/0811 |
| | | | 711/E12.024 |
| 2017/0371783 A1 | 12/2017 | Le et al. | |
| 2022/0083473 A1* | 3/2022 | Sharma | G06F 12/0804 |

OTHER PUBLICATIONS

Kim, Hyunhee, et al., "Reusability-Aware Cache Memory Sharing for Chip Multiprocessors with Private L2 Caches," Journal of Systems Architecture 55.10-12 (2009): 446-456.

* cited by examiner

*Primary Examiner* — Masud K Khan
(74) *Attorney, Agent, or Firm* — Brian F. Russell; Nathan Rau

(57) ABSTRACT

A data processing system includes system memory and a plurality of processor cores each supported by a respective one of a plurality of vertical cache hierarchies. A first vertical cache hierarchy records information indicating communication of cache lines between the first vertical cache hierarchy and others of the plurality of vertical cache hierarchies. Based on selection of a victim cache line for eviction, the first vertical cache hierarchy determines, based on the recorded information, whether to perform a lateral castout of the victim cache line to another of the plurality of vertical cache hierarchies rather than to system memory and selects, based on the recorded information, a second vertical cache hierarchy among the plurality of vertical cache hierarchies as a recipient of the victim cache line via a lateral castout. Based on the determination, the first vertical cache hierarchy performs a castout of the victim cache line.

20 Claims, 11 Drawing Sheets

US 11,561,900 B1

TARGETING OF LATERAL CASTOUTS IN A DATA PROCESSING SYSTEM

BACKGROUND OF THE INVENTION

The present invention relates generally to data processing and, in particular, targeting of lateral castouts from a vertical cache hierarchy of a multiprocessor data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor core in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block.

BRIEF SUMMARY

A cache memory is often required to evict or "castout" a cache line held in the cache, for example, to make room for a different cache line that is more likely to be accessed by the associated processor core. In some cases, it is desirable to perform a "lateral" castout (LCO) of the victim cache line, that is, a castout that targets another cache at a same level of the cache hierarchy, rather than to perform a "vertical" castout of the victim cache line, for example, to system memory. By installing the victim cache line in another cache rather than in system memory, the cache line is maintained at an access latency that is significantly lower than that of system memory.

In the prior art, LCOs were generally distributed randomly. In at least some embodiments of the inventions disclosed herein, the targeting of a LCO in a multiprocessor data processing system is improved based on observed data access patterns.

In at least one embodiment, a data processing system includes system memory and a plurality of processor cores each supported by a respective one of a plurality of vertical cache hierarchies. A first vertical cache hierarchy records information indicating communication of cache lines between the first vertical cache hierarchy and others of the plurality of vertical cache hierarchies. Based on selection of a victim cache line for eviction, the first vertical cache hierarchy determines, based on the recorded information, whether to perform a lateral castout of the victim cache line to another of the plurality of vertical cache hierarchies rather than to system memory and selects, based on the recorded information, a second vertical cache hierarchy among the plurality of vertical cache hierarchies as a recipient of the victim cache line via a lateral castout. Based on the determination, the first vertical cache hierarchy performs a castout of the victim cache line.

DETAILED DESCRIPTION

Figure 1:
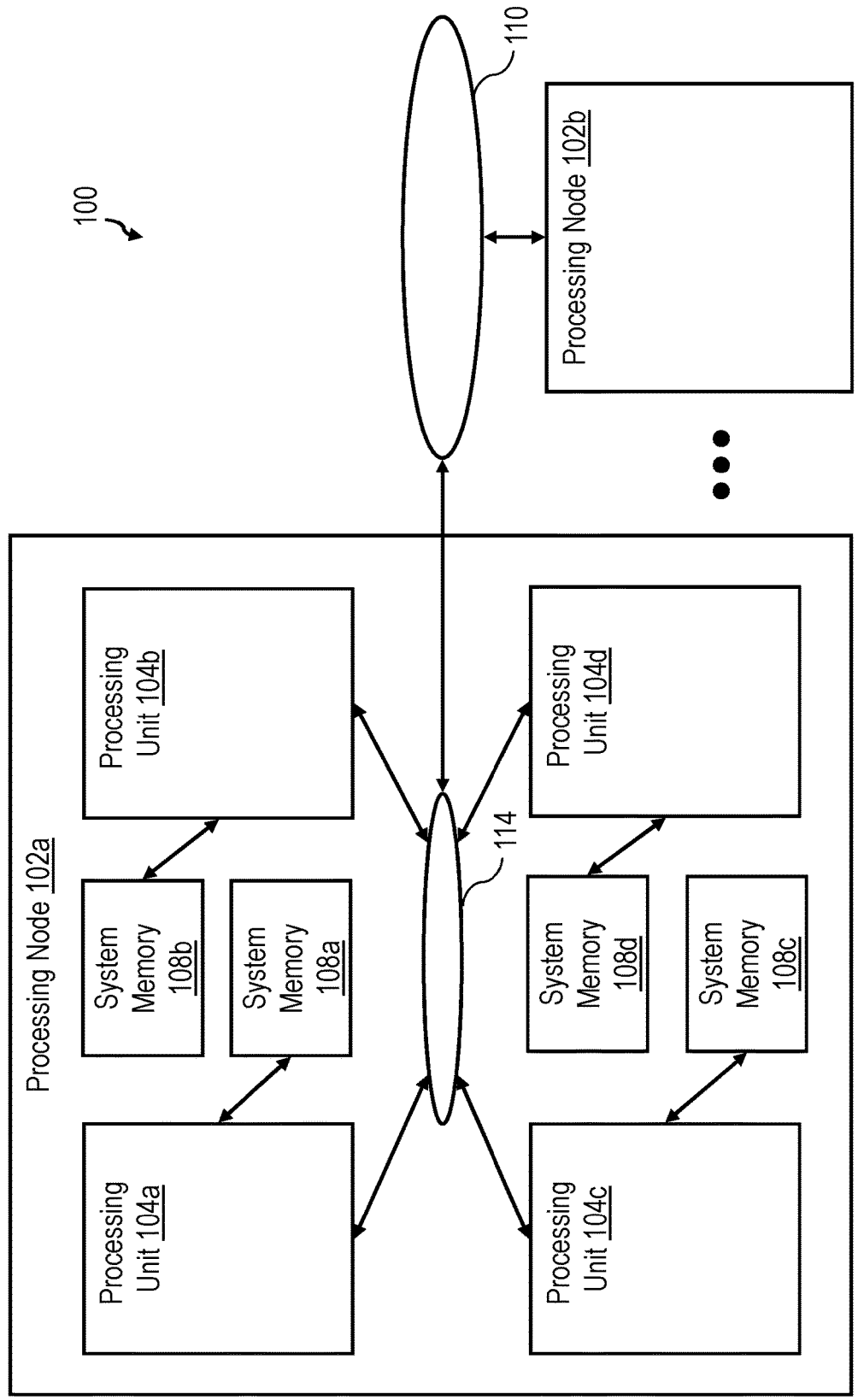
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing multiple (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 206 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 206 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
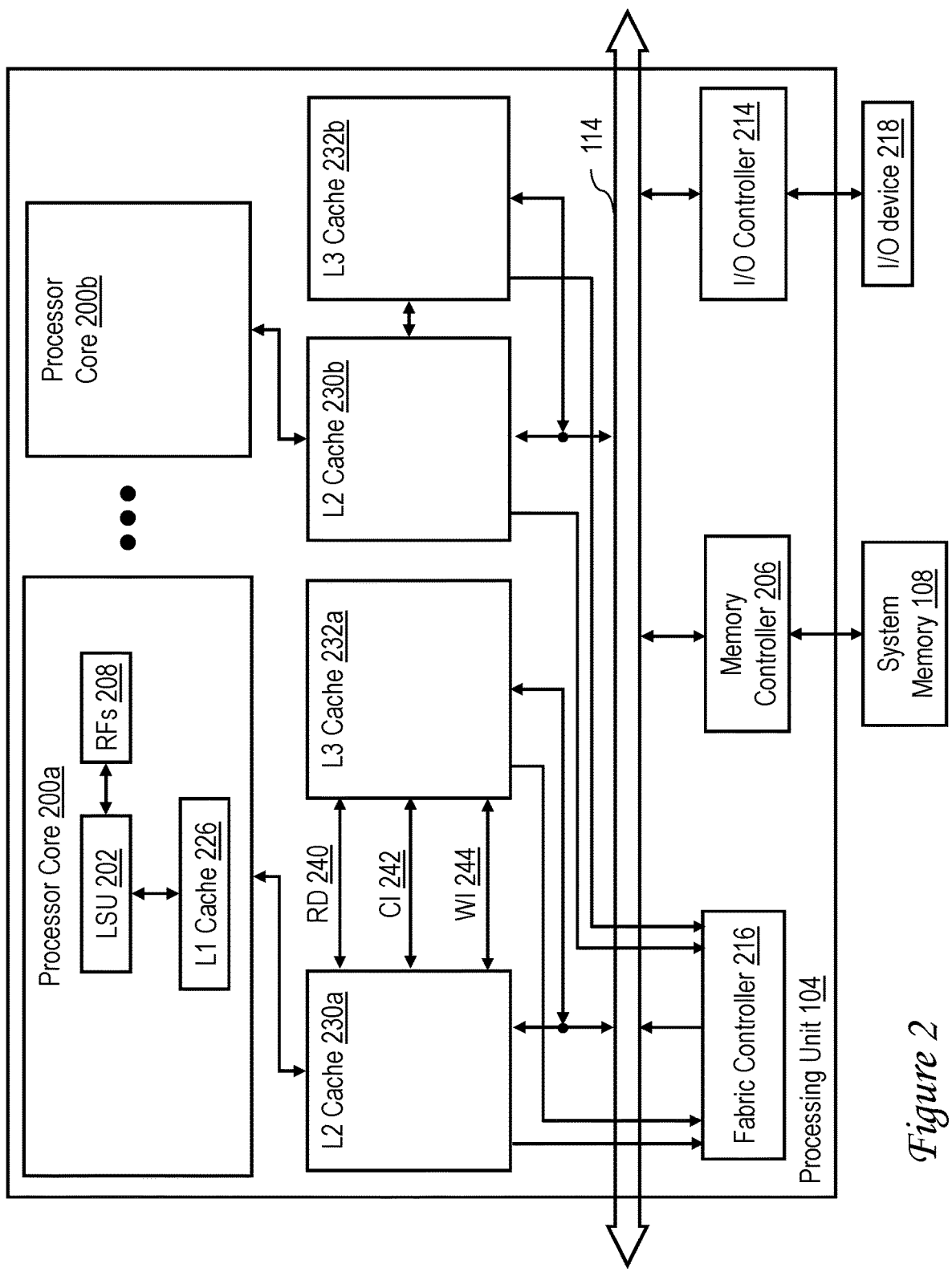
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In at least some embodiments, each processor core 200 is capable of independently executing multiple simultaneous hardware threads of execution.

As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level memory hierarchy having at its lowest level shared system memories 108 (each accessed via a respective integrated memory controller 206), and at its upper levels, one or more levels of cache memory. In the illustrative embodiment, the vertical cache hierarchy supporting each processor core 200 includes a store-through level one (L1) cache 226 within and private to the processor core 200, a respective store-in level two (L2) cache 230 (e.g., L2 cache 230a or 230b), and a respective lookaside level three (L3) victim cache 232 (e.g., L3 cache 232a or 232b) populated with cache lines evicted from one or more of L2 caches 230. As shown in detail for L2 cache 230a and L3 cache 232a, each L2-L3 cache interface includes a number of channels, including read (RD) channel 240, cast-in (CI) channel 242, and a write inject (WI) channel 244. Each of L2 caches 230 and L3 caches 232 is further coupled to local interconnect 114 and to a fabric controller 216 to facilitate participation of caches 230, 232 in the coherent data communication of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents of the upper levels of cache.

Each processing unit 104 further includes an integrated and distributed fabric controller 216 responsible for controlling the flow of operations on the interconnect fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices 218.

In operation, when a hardware thread under execution by a processor core 200 includes a memory access (e.g., load or store) instruction requesting a specified memory access operation to be performed, LSU 202 executes the memory access instruction to determine the target address (e.g., an effective address) of the memory access request. After translation of the target address to a real address, L1 cache 226 is accessed utilizing the target real address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate a transaction including the memory access request on the interconnect fabric.

Figure 3:
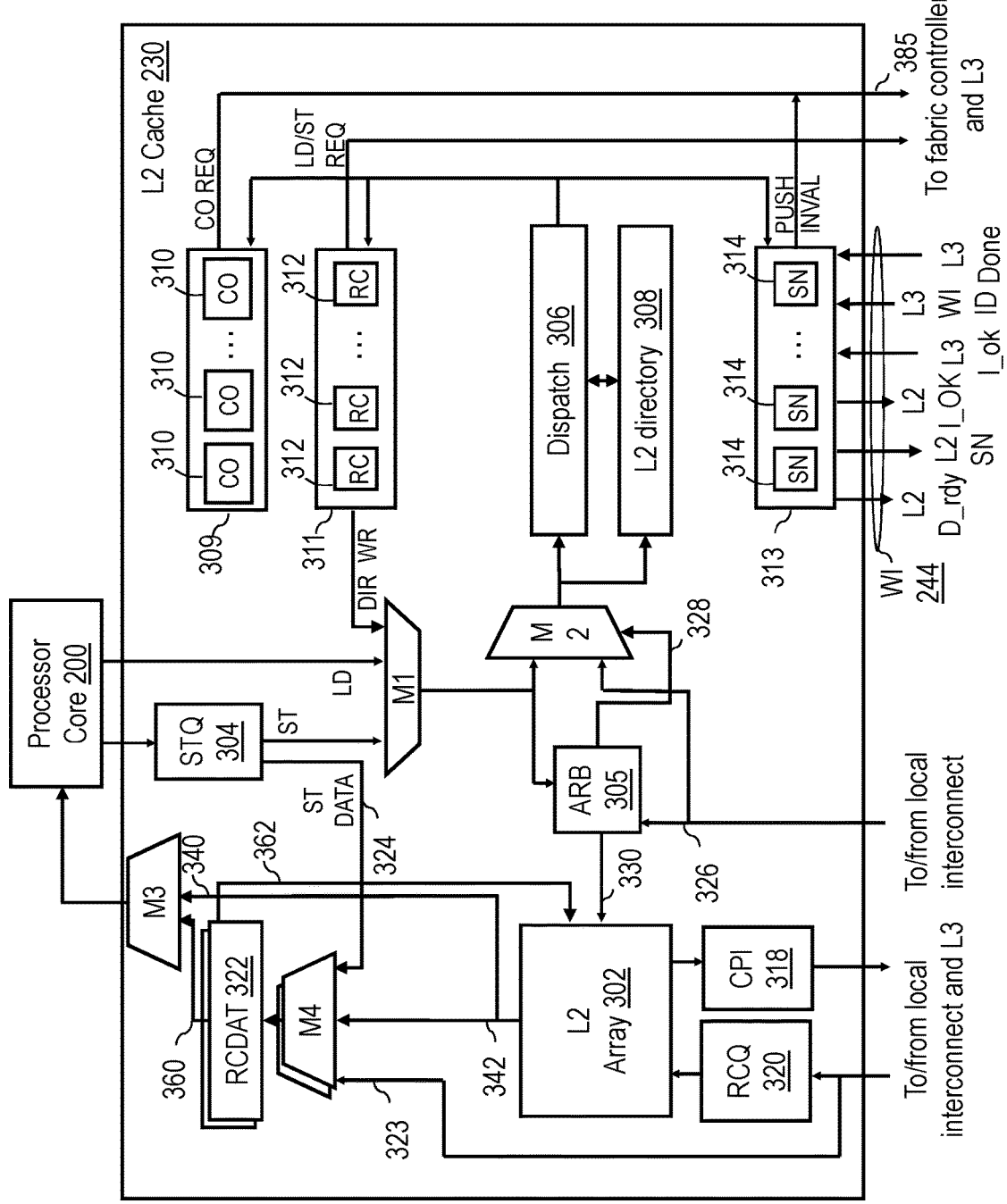
FIG. 3 is a more detailed block diagram of a level two (L2) cache in accordance with one embodiment.

With reference now to FIG. 3, there is illustrated a more detailed block diagram of an exemplary embodiment of a L2 cache 230 in accordance with one embodiment. As shown in FIG. 3, L2 cache 230 includes a L2 array 302 and a L2 directory 308 of the contents of L2 array 302. Although not explicitly illustrated, L2 array 302 preferably is implemented with a single read port and single write port to reduce the die area required to implement L2 array 302.

Assuming L2 array 302 and L2 directory 308 are set-associative as is conventional, memory locations in system memories 108 are mapped to particular congruence classes within L2 array 302 utilizing predetermined index bits within the system memory (real) addresses. The particular memory blocks stored within the cache lines of L2 array 302 are recorded in L2 directory 308, which contains one directory entry for each cache line.

L2 cache 230 additionally includes read-claim logic 311 including multiple (e.g., 16) read-claim (RC) machines 312 for independently and concurrently servicing load (LD) and store (ST) requests received from the affiliated processor core 200. As will be appreciated, the servicing of memory access requests by RC machines 312 may require the replacement or invalidation of memory blocks within L2 array 302. Accordingly, L2 cache 230 also includes castout logic 309 including multiple CO (castout) machines 310 that independently and concurrently manage the removal of memory blocks from L2 array 302 and the storage of those memory blocks in system memory 108 (i.e., writebacks) or a L3 cache 232 (i.e., L3 cast-ins).

In order to service remote memory access requests originating from processor cores 200 other than the affiliated processor core 200, L2 cache 230 also includes snoop logic 313 including multiple snoop machines 314. Snoop machines 314 can independently and concurrently service a remote memory access request "snooped" from local interconnect 114. As shown in FIG. 3, snoop logic 313 is coupled to the associated L3 cache 232 by WI channel 244, which is also illustrated in FIG. 2. WI channel 244 preferably includes (from the perspective of L2 cache 230) multiple signals lines suitable for transmitting at least a L2 data ready (L2 D_rdy) signal (which preferably includes a respective signal line for each SN machine 314 in L2 cache 230), a multi-bit L2 snoop machine ID (L2 SN ID) signal and a L2 inject OK (L2 I_OK) signal, and for receiving a L3 inject OK (L3 I_OK) signal, a multi-bit L3 write inject machine ID (L3 WI ID) signal, and a L3 Done signal (which preferably includes a respective signal line for each WI machine 314 in L3 cache 232).

L2 cache 230 further includes an arbiter 305 that controls multiplexers M1-M2 to order the processing of local memory access requests received from the affiliated processor core 200 and remote memory access requests snooped on local interconnect 114. Such memory access requests, including local load and store requests and remote load and store requests, are forwarded in accordance with the arbitration policy implemented by arbiter 305 to dispatch logic, such as a dispatch pipeline 306, which processes each memory access request with respect to L2 directory 308 and L2 array 302 and, if necessary and the required resource is available, dispatches the memory access request to the appropriate state machine for handling.

L2 cache 230 also includes an RC queue (RCQ) 320 and a castout push intervention (CPI) queue 318 that respectively buffer data being inserted into and removed from the L2 array 302. RCQ 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 314, such that CO machines 310 and snoopers 314 direct transfer of data from L2 array 302 (e.g., to another L2 cache 230, to the associated L3 cache 232, or to a system memory 108) via only their respective designated CPI buffer entries.

Each RC machine 312 also has assigned to it a respective one of multiple RC data (RCDAT) buffers 322 for buffering a memory block read from L2 array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in L2 directory 308, and if the memory address hits, the coherency state of the target memory block. The directory information, which includes a hit/miss indication and the coherency state of the memory block, is returned by L2 directory 308 to dispatch pipeline 306 in a subsequent cycle. As will be appreciated, no action is generally taken within a L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to L2 array 302 via address and control path 330 to initiate a cache read of the memory block specified by the request address. The memory block read from L2 array 302 is transmitted via data path 342 to multiplexer M4 for insertion into the appropriate RCDAT buffer 322. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 314 or RC machine 312, (2) the directory information, and (3) availability of an RC machine 312 or snoop machine 314 to process the memory access request. If dispatch pipeline 306 makes a dispatch determination that the memory access request is to be dispatched, the memory access request is dispatched from dispatch pipeline 306 to an RC machine 312 or a snoop machine 314. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of L2 directory 308, if necessary. In addition, the RC machine 312 may perform a cache write to update the relevant cache line of L2 array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in L2 directory 308, a copy of the target memory block is forwarded from L2 array 302 to the affiliated processor core 200 via data path 340 and load data multiplexer M3 and additionally forwarded to RCDAT buffer 322 via data path 342. The data forwarded to RCDAT buffer 322 via data path 342 and store data multiplexer M4 is then forwarded from RCDAT 322 to the affiliated processor core 200 via data path 360 and multiplexer M3. For a local store request, store data is received within RCDAT buffer 322 from STQ 304 via data path 324 and store data multiplexer M4, the store is merged with the memory block read into RCDAT buffer 322 from L2 array 302 via multiplexer M4, and the merged store data is then written from RCDAT buffer 322 into L2 array 302 via data path 362. In response to a local load miss or local store miss, the target memory block acquired through issuing a memory access operation on local interconnect 114 is loaded into L2 array 302 via reload bus 323, store data multiplexer M4, RCDAT buffer 322 (with store merge for a store miss) and data path 362.

Figure 4:
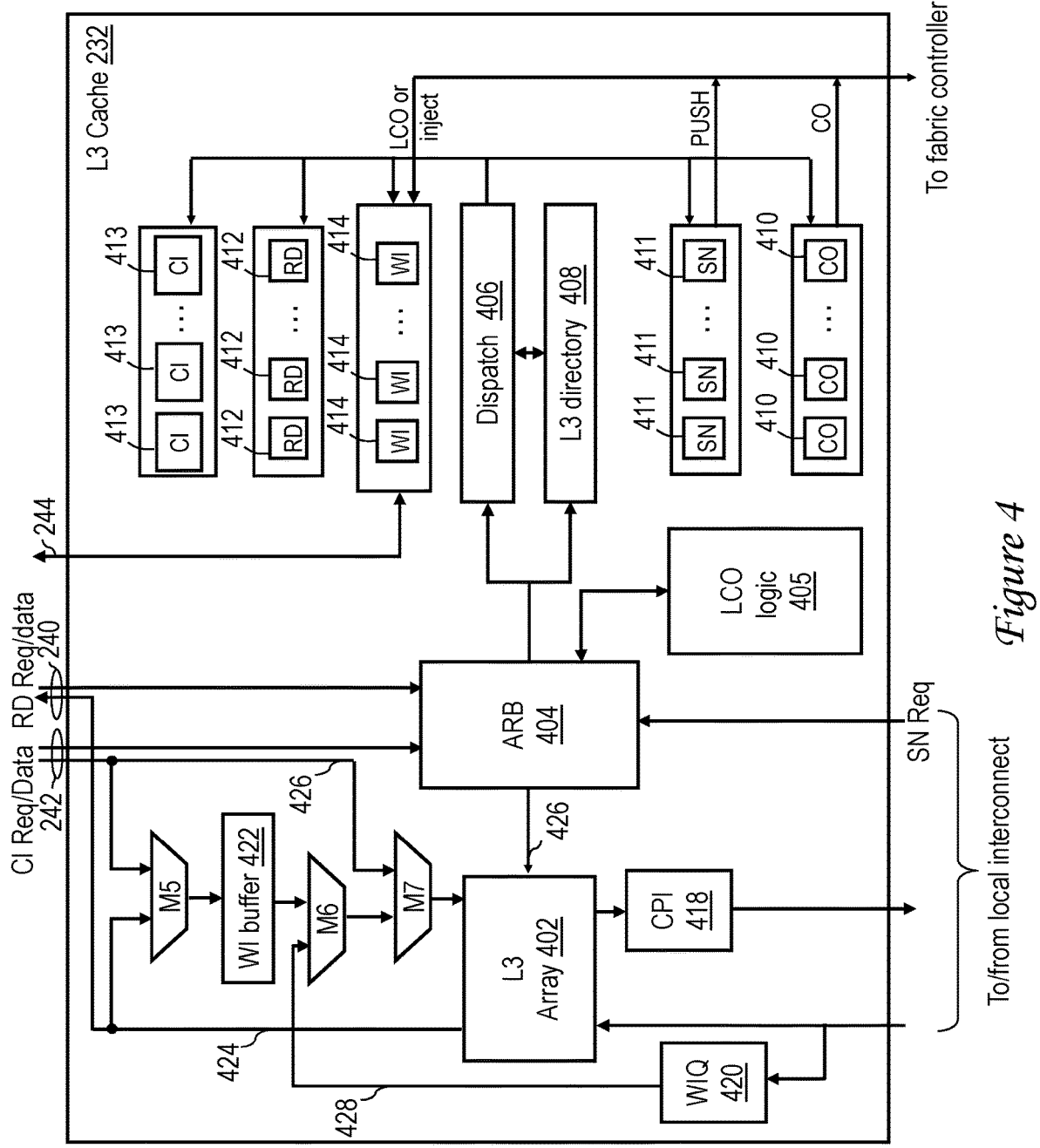
FIG. 4 is a more detailed block diagram of a level three (L3) cache in accordance with one embodiment.

Referring now to FIG. 4, there is depicted a more detailed view of a L3 cache 232 in accordance with one embodiment. As shown in FIG. 4, L3 cache 232 includes a L3 array 402 and a L3 directory 408 of the contents of L3 array 402. Assuming L3 array 402 and L3 directory 408 are set-associative as is conventional, memory locations in system memories 108 are mapped to particular congruence classes within L3 array 402 utilizing predetermined index bits within the system memory (real) addresses. The particular memory blocks stored within the cache lines of L3 array 402 are recorded in L3 directory 408, which contains one directory entry for each cache line. While not expressly depicted in FIG. 4, it will be understood by those skilled in the art that each directory entry in L3 directory 408 includes various fields, for example, a tag field that identifies the real address of the memory block held in the corresponding cache line of L3 array 402, a state field that indicate the coherency state of the cache line, and a replacement order (e.g., LRU) field indicating a replacement order for the cache line with respect to other cache lines in the same congruence class.

L3 cache 232 additionally includes various state machines to service various types of requests and to transfer data into and out of L3 array 402. For example, L3 cache 232 includes multiple (e.g., 16) read (RD) machines 412 for independently and concurrently servicing read (RD) requests received from the affiliated L2 cache 230 via RD channel 240. L3 cache 232 also includes multiple snoop (SN) machines 411 for handling remote memory access requests snooped from local interconnect 114 that originate from L2 caches 230 supporting remote processor cores 200. As is known in the art, the servicing of snooped requests may include, for example, invalidating cache lines in L3 directory 408 and/or sourcing cache lines of data from L3 array 402 by cache-to-cache intervention. L3 cache 232 additionally includes multiple cast-in (CI) machines 413 for servicing cast-in (CI) requests received from the affiliated L2 cache 230 via CI channel 242. As will be appreciated, the servicing of cast-in requests by CI machines 413 by storing in L3 array 402 cache lines castout from the associated L2 cache 230 may require the replacement of memory blocks in L3 array 402. Accordingly, L3 cache 232 also includes castout (CO) machines 410 that manage the removal of memory blocks from L3 array 402 and, if necessary, the writeback of those memory blocks to system memory 108. Data removed from L3 cache 232 by CO machines 410 and SN machines 411 is buffered in a castout push intervention (CPI) queue 418 prior to transmission to local interconnect 114. In addition, L3 cache 232 includes a plurality of write inject (WI) machines 414 that service requests received on local interconnect 114 to inject partial or full cache lines of data into the L3 array 402 of L3 cache 232. Write injection data received in conjunction with write injection requests is temporarily held in a write inject queue 420 (WIQ), which preferably includes one or more entries each having the width of a full cache line (e.g., 128 bytes). In a preferred embodiment, write injection requests are serviced exclusively by L3 cache 232 to avoid introducing additional complexity into higher level caches having lower access latency requirements, such as L2 cache 230.

L3 cache 230 further includes an arbiter 404 that orders the processing of CI requests and RD requests received from the associated L2 cache 230, as well as remote memory access requests and write injection requests snooped from local interconnect 114. These memory access requests are forwarded in accordance with the arbitration policy implemented by arbiter 404 to dispatch logic, such as a dispatch pipeline 406, which processes each memory access request with respect to L3 directory 408 and L3 array 402 and, if necessary, dispatches the memory access requests to the appropriate state machines 411, 412, 413 or 414 for processing. If necessary, at a predetermined time during processing of the memory access request within dispatch pipeline 406, arbiter 404 transmits the request's target real address to L3 array 402 via address and control path 426 to initiate a cache read of the memory block specified by the request's target real address.

Arbiter 404 is further coupled to lateral castout (LCO) logic 405, which may indicate whether victim cache lines to be evicted from L3 array 402 are to be castout vertically to lower level storage (e.g., system memory 108) or castout laterally to another L3 cache 232. In addition, if an LCO is to be performed, LCO logic 405 additionally may select the target for the LCO from among the other L3 caches 232 in its LCO group. For example, in some embodiments, each LCO group may be defined to include all L3 caches 232 in a particular processing node 102. In other embodiments, LCO groups may instead include the L3 caches 232 in multiple nodes 102.

FIG. 4 additionally illustrates data handling logic and data paths utilized to service various types of memory access requests in the illustrated embodiment. In the illustrated embodiment, the data handling logic includes multiplexers M5, M6 and M7 and a write inject buffer 422. The data paths include a data path 424, which can forward data read from L3 array 402, for example, in response to a RD request or a WI request, to multiplexer M5 and RD channel 240. L3 cache 232 additionally includes a data path 428, which can forward CI data received from the associated L2 cache 230 to multiplexers M5 and M7. L3 further includes data path 428, which can forward WI data held in WIQ 420 to multiplexer M6. Unillustrated select signals generated by arbiter 404 select which data, if any, is written into L3 array 402 by multiplexer M7.

Figure 5:
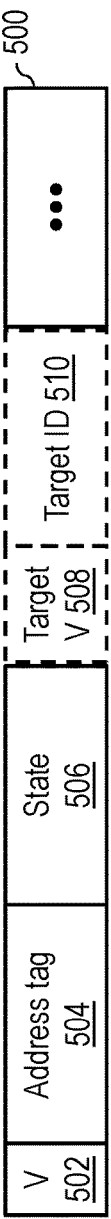
FIG. 5 illustrates an exemplary cache directory entry in accordance with one embodiment.

With reference now to FIG. 5, there is illustrated an exemplary cache directory entry 500 in accordance with one embodiment. Directory entries 500 can be implemented in L2 directory 308 and L3 directory 408.

In the depicted example, directory entry 500 includes a valid field 502 indicating whether or not the contents of directory entry 500 are valid, a tag field 504 that identifies the real address of the memory block held in the corresponding entry of L2 array 302 or L3 array 402, and a state field 506 that indicates the coherency state of the cache line. In some embodiments, directory entry 500 additionally includes optional target valid field 508 and target identifier (ID) field 510. Target valid field 508 indicates whether or not the contents of target ID field 510 are valid, and target ID field 510 identifies a source cache memory from which the memory block held in the corresponding entry of L2 array 302 or L3 array 402 was received or a destination cache memory to which a copy of the memory block was intervened from the corresponding entry of L2 array 302 or L3 array 402. As discussed below with respect to FIGS. 10-11, in at least some embodiments, the contents of target ID field 510 can be utilized to intelligently select a target L3 cache 232 to which the memory block in the corresponding entry is to be castout.

Figure 6:
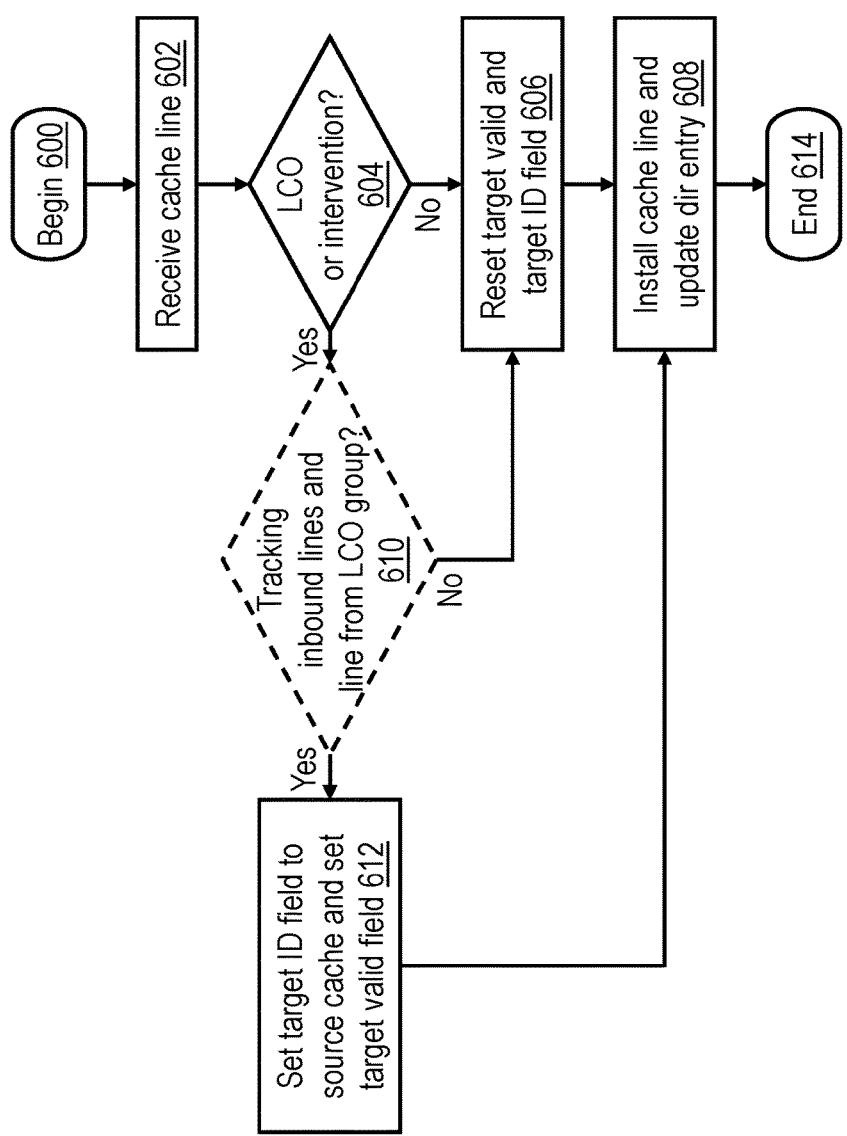
FIG. 6 is a high-level logical flowchart of an exemplary method of installing a cache line into a lower-level cache memory in accordance with one embodiment.

Referring now to FIG. 6, there is depicted a high-level logical flowchart of an exemplary method of installing a cache line into a lower-level (e.g., L2 or L3) cache memory in accordance with one embodiment. The process begins at block 600 and then proceeds to block 602, which illustrates a lower-level cache, such as an L2 cache 230 or L3 cache 232, receiving a cache line on the system fabric of data processing system 100, for example, via cache injection (i.e., an I/O device 218 writing data directly into a cache memory), via a LCO operation received from a peer L3 cache 232, or via a memory controller 206 or cache memory 230 or 232 responding to a read-type request. At block 604, the lower-level cache memory determines if the cache line received at block 602 was received from another lower-level cache memory in a LCO operation or by cache-to-cache intervention. If not, meaning that data source of the cache line was an I/O device 208 or system memory 108, the lower-level cache resets target valid field 508 and target ID 510 in the relevant entry 500 in the L2 directory 308 or L3 directory 408 (block 606). In addition, the lower-level cache memory installs the cache line in the corresponding entry of L2 array 302 or L3 array 402 and, as needed, sets valid field 502, address tag field 504, and state field 506 (block 608). Thereafter, the process of FIG. 6 ends at block 614.

Returning to block 604, in response to an affirmative determination, the process passes to block 610, which is a decision box illustrating alternative implementations or operating modes of the lower-level cache memory. If the lower-level cache memory is not presently configured to track the sources of in-bound cache lines, the process simply passes to block 608, which has been described. If, however, the lower-level cache memory is configured to track the sources of in-bound cache lines and the in-bound cache line is received from a vertical cache hierarchy in the LCO group of the present lower-level cache, the lower-level cache memory sets target ID field 510 of the relevant entry 500 in the L2 directory 308 or L3 directory 408 to identify the source cache from which the in-bound cache line was received and sets target valid field 508 to a valid state (block 612). The identity of the source cache can be determined, for example, from a source tag in the data tenure communicating the cache line on the system fabric of data processing system 100. Following block 612, the process of FIG. 6 passes to block 608, which has been described.

In at least some embodiments, the vertical cache hierarchies of data processing system 100 are configured such that the L2 cache 230 and L3 cache 232 in the same vertical cache hierarchy as non-inclusive, meaning that a copy of a memory block can be held in the L2 cache 230 or L3 cache 232 of a given processor core 200 but cannot be held in both caches concurrently. As a given cache line moves up and down in the vertical cache hierarchy of a given processor core 200 (e.g., due to a memory access request of L2 cache 230 or a castout from L2 cache 230), the contents of target valid field 508 and target ID field 510 preferably move between entries 500 in L2 directory 308 and L3 directory 408, such that the target information provided by target ID field 510, if any, is preserved for the duration of the tenure of the cache line in the vertical cache hierarchy.

Figure 7:
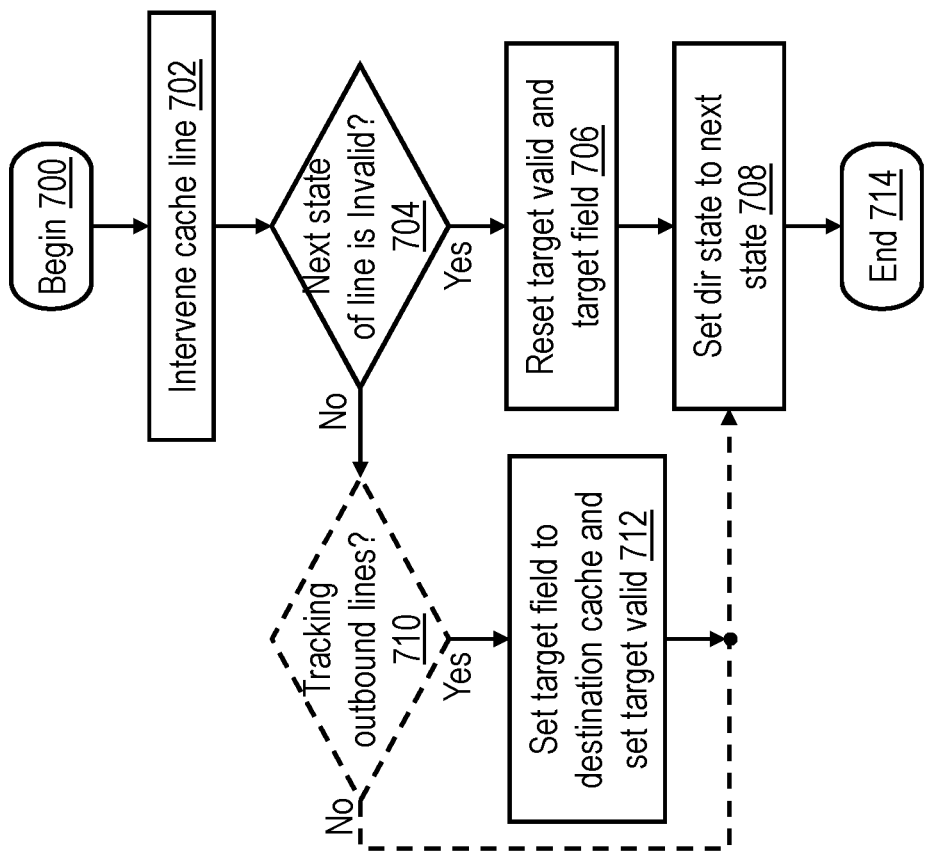
FIG. 7 is a high-level logical flowchart of an exemplary method of updating a cache directory in response to intervening a cache line from a lower-level cache in accordance with one embodiment.

With reference now to FIG. 7, there is illustrated a high-level logical flowchart of an exemplary method of updating a cache directory in response to intervening a cache line from a lower-level (e.g., L2 or L3) cache in accordance with one embodiment. The process of FIG. 7 begins at block 700 and then proceeds to block 702, which illustrates the lower-level cache memory intervening a cache line held in L2 array 302 or L3 array 402 to another lower-level cache memory, for example, in response to a memory access request snooped on the system fabric of data processing system 100. At block 704, the lower-level cache memory determines whether or not the next coherence state of the cache line to be recorded in the relevant entry 500 in one of L2 directory 308 and L3 directory 408 is an invalid state. If so, the lower-level cache resets the target valid field 508 and target ID field 510 for the intervened cache line (block 706). In addition, at block 708, the lower-level cache sets state field 506 to the next state (e.g., an invalid state). Thereafter, the process of FIG. 7 ends at block 714.

Returning to block 704, in response to a negative determination, the process passes to block 710, which is a decision box illustrating alternative implementations or operating modes of the lower-level cache memory. If the lower-level cache memory is not presently configured to track the sources of in-bound cache lines, the process passes to block 708, which depicts the lower-level cache updating state field 506 to the next state determined by the selected coherence protocol. Thereafter, the process of FIG. 7 ends at block 714. If, however, the lower-level cache memory is configured to track the sources of in-bound cache lines, the process proceeds from block 710 to block 712, which illustrates lower-level cache memory setting target ID field 510 of the relevant entry 500 in the L2 directory 308 or L3 directory 408 to identify the destination cache to which the out-bound cache line was intervened and sets target valid field 508 to a valid state. The identity of the destination cache can be determined, for example, from a master tag in the memory access request snooped on the system fabric of data processing system 100 that caused the lower-level cache to intervene the cache line. Following block 712, the process of FIG. 7 passes to block 708, which has been described.

Figure 8:
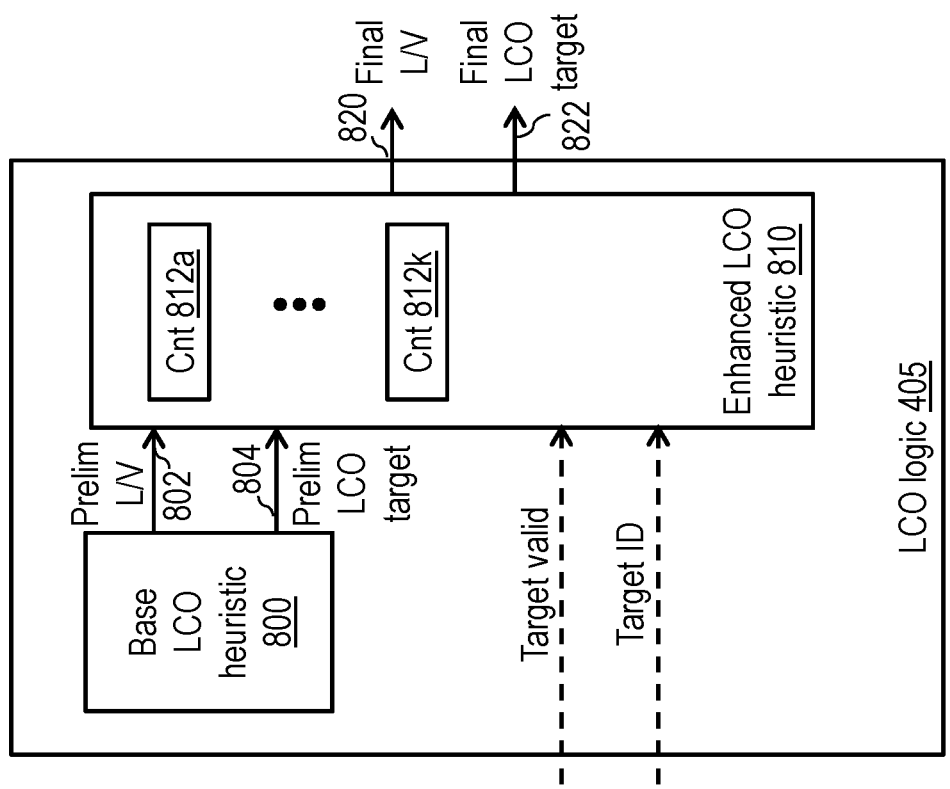
FIG. 8 depicts a more detailed block diagram of lateral castout (LCO) logic in accordance with one embodiment.

Referring now to FIG. 8, there is depicted a more detailed block diagram of lateral castout (LCO) logic 405 in accordance with one embodiment. As shown, in this example, LCO logic 405 includes a base LCO heuristic logic 800, which can be, but is not required to be, entirely conventional. Base LCO heuristic 800 generates a preliminary lateral/vertical (L/V) signal 802 providing a preliminary indication of whether or not a cache line to be evicted from L3 array 402 should be castout laterally (i.e., to another L3 cache 232) or vertically (i.e., to the relevant system memory 108). In addition, if preliminary L/V signal 802 indicates a LCO, base LCO heuristic provides a preliminary LCO target signal 804 indicating a target L3 cache 232 in the same LCO group to receive the cache line to be castout laterally. Base LCO heuristic 800 can select the target L3 cache 232, for example, by random or round robin selection of a L3 cache 232 within its LCO group.

LCO logic 405 additionally includes enhanced LCO heuristic logic 810, which receives as inputs the preliminary L/V signal 802 and the preliminary LCO target signal 804 generated by base LCO heuristic logic 800, as well as the contents, if present, of the target valid field 508 and target ID field 510 of the directory entry 500 of the cache line to be castout of L3 cache 232. In this example, enhanced LCO heuristic logic 810 implements counters 812a-812k, which are each associated with a respective one of the other L3 caches 232 in the same LCO group as the present L2 cache 232. Thus, if the LCO group includes a total of N L3 caches 232, enhanced LCO heuristic logic 810 preferably implements N−1 counters 812. As discussed below with reference to FIG. 9, each counter 812 counts a number of cache lines transmitted to and/or from the present L3 cache 232 and a respective one of the other vertical cache hierarchies in the same LCO group. Based on the count value of counters 812 and, if implemented, the contents of target valid field 508 and target ID field 510, enhanced LCO heuristic logic 810 generates a final lateral/vertical (L/V) signal 820 indicating whether or not a cache line to be evicted from L3 array 402 should be castout laterally or vertically and, if final L/V signal 820 indicates a LCO, a final LCO target signal 822 indicating a target L3 cache 232 in the LCO group to receive the cache line to be castout laterally.

Figure 9:
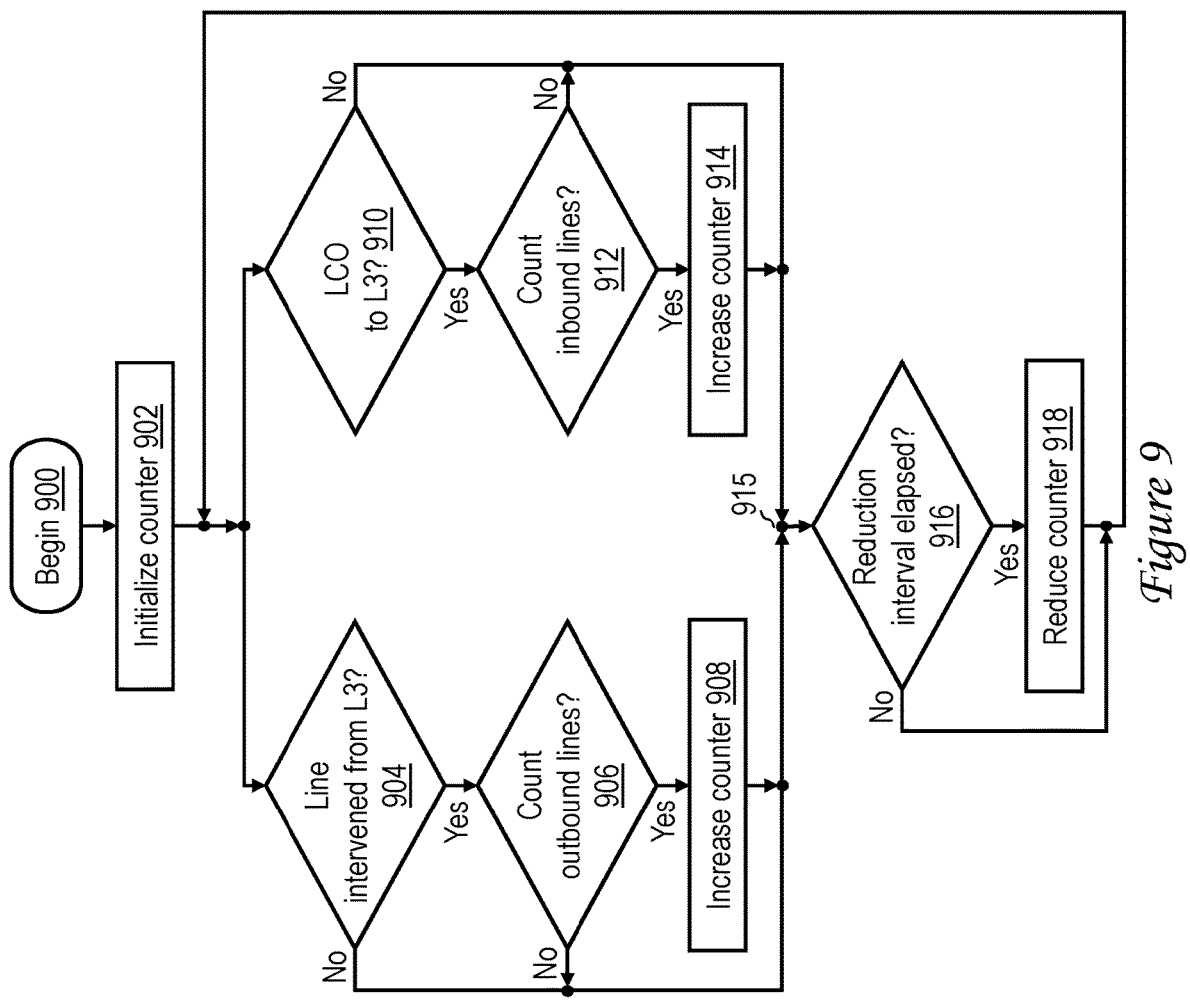
FIG. 9 is a high-level logical flowchart of an exemplary method by which LCO logic manages counters utilized to track data access patterns in accordance with one embodiment.

With reference now to FIG. 9, there is illustrated a high-level logical flowchart of an exemplary method by which LCO logic 405 manages the counters 812a-812k utilized to track data access patterns in accordance with one embodiment. One instance of the illustrated process is performed independently for each of counters 812a-812k. It will be appreciated by those skilled in the art that alternative or additional methods of managing counters 812 may be employed.

The illustrated process begins at block 900 and then proceeds to block 902, which illustrates enhanced LCO heuristic logic 810 initializing a particular counter 812 to an initial value, such as 0. The process then bifurcates and proceeds in parallel to blocks 904-906 and blocks 908-910. At blocks 904-906, enhanced LCO heuristic logic 810 determines whether a cache line has been intervened from the present L3 cache 232 to the vertical cache hierarchy associated with the particular counter 812 and whether enhanced LCO heuristic logic 810 is presently configured to count outbound cache lines intervened by the present L3 cache 232. In various embodiments or operating modes, enhanced LCO heuristic logic 810 may be configured to count outbound caches only, inbound cache lines only, or both outbound and inbound cache lines. If enhanced LCO heuristic logic 810 makes an affirmative determination at both of blocks 904-906, enhanced LCO heuristic logic 810 increases the value of the particular counter 812 in a saturating fashion (block 908). It should be appreciated that at block 908 enhanced LCO heuristic logic 810 may increase the value of the relevant counter 812 by multiple increments in a given cycle since multiple SN machines 411 and/or CO machines 410 may source outbound cache lines concurrently. Following block 908 or in response to a negative determination at either of blocks 904-906, the process passes to join point 915.

Referring now to blocks 910-912, enhanced LCO heuristic logic 810 determines whether a cache line has been received by the present L3 cache 232 via a LCO and whether enhanced LCO heuristic logic 810 is presently configured to count inbound cache lines received via LCO by the present L3 cache 232. If enhanced LCO heuristic logic 810 makes an affirmative determination at both of blocks 910-912, enhanced heuristic LCO logic 810 increases the value of the particular counter 812 in a saturating fashion (block 914). It should be appreciated that at block 914 enhanced LCO heuristic logic 810 may increase the value of the relevant counter 812 by multiple increments in a given cycle since multiple WI machines 414 may receive inbound cache lines concurrently. Following block 914 or in response to a negative determination at either of blocks 910-912, the process passes to join point 915.

Once both of the sub-processes shown at blocks 904-908 and blocks 910-914 reach joint point 915, the process proceeds to block 916. Block 916 depicts enhanced heuristic LCO logic 810 determining whether or not a reduction interval has elapsed since the value of the counter 812 was last reduced. If not, the process of FIG. 9 continues to iterate. If, however, enhanced heuristic LCO logic 810 determines at block 916 that the reduction interval has elapsed, enhanced heuristic LCO logic 810 reduces the value of the particular counter 812 to a non-negative value, for example, by subtracting a fixed value, shifting the count value to the right a selected number of places, etc. (block 918). Thereafter, the process returns to blocks 904-908 and 910-914, which have been described.

Figure 10:
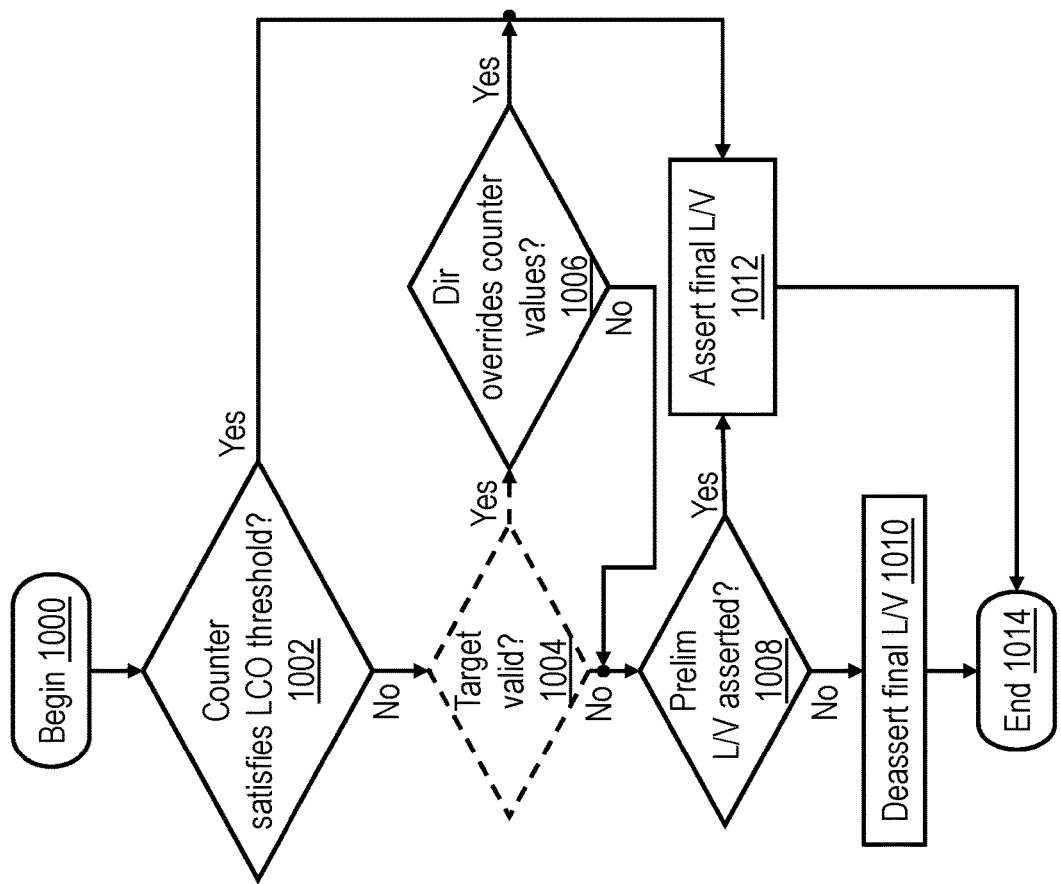
FIG. 10 is a high-level logical flowchart of an exemplary method by which LCO logic determines whether to perform a LCO in accordance with one embodiment.

Referring now to FIG. 10, there is depicted a high-level logical flowchart of an exemplary method by which LCO logic 405 determines whether to perform a LCO for an evicted cache line in accordance with one embodiment. The process of FIG. 10 begins at block 1000, for example, in response to selection of a cache line held in L3 array 408 for eviction. The selection of the victim cache line may be made from among the cache lines in its congruence class based on, for example, a least recently used (LRU) vector. Following block 1000, the process proceeds to block 1002, which illustrates enhanced heuristic LCO logic 810 determining whether or not the value of any of counters 812a-812k satisfies (e.g., is greater than or equal to) a LCO threshold. If so, the process passes directly to block 1012, which illustrates enhanced heuristic LCO logic 810 asserting final L/V signal 820 to signify that a LCO of the victim cache line will be performed. Thereafter, the process of FIG. 10 ends at block 1014.

Returning to block 1002, in response to a negative determination, the process passes to optional block 1004, which illustrates enhanced heuristic LCO logic 810 determining whether or not target valid field 508 of the directory entry 500 for the victim cache line indicates target ID field 510 is valid. If not, or if optional block 1004 is omitted, the process proceeds to block 1008, which is described below. If, however, enhanced heuristic LCO logic 810 makes an affirmative determination at block 1004, enhanced heuristic LCO logic 810 additionally determines at block 1006 whether or not LCO logic 405 is presently configured to follow the specific targeting information provided by target ID field 510 (which indicates the source cache hierarchy for the victim cache line) to override the more general targeting information provided by counters 812a-812k (which indicate the vertical cache hierarchies that the present L3 cache 232 most frequently communicates cache lines). If so, the process passes to block 1012, which has been described. If not, the process of FIG. 10 passes from block 1006 to block 1008.

Block 1008 illustrates enhanced heuristic LCO logic 810 determining whether or not preliminary L/V signal 802 is asserted to indicate a LCO for this victim cache line. If so, the process passes to block 1012, which illustrates enhanced heuristic LCO logic 810 asserting final L/V signal 820 to indicate than a LCO will be performed for the victim cache line. However, if enhanced heuristic LCO logic 810 determines at block 1008 that preliminary L/V signal 802 is not asserted for this victim cache line, enhanced heuristic LCO logic 810 deasserts final L/V signal 820 to indicate than a LCO will not be performed for the victim cache line and that a vertical castout to the relevant main memory 108 will instead be performed (block 1010). Following block 1010, the process of FIG. 10 ends at block 1014.

Figure 11:
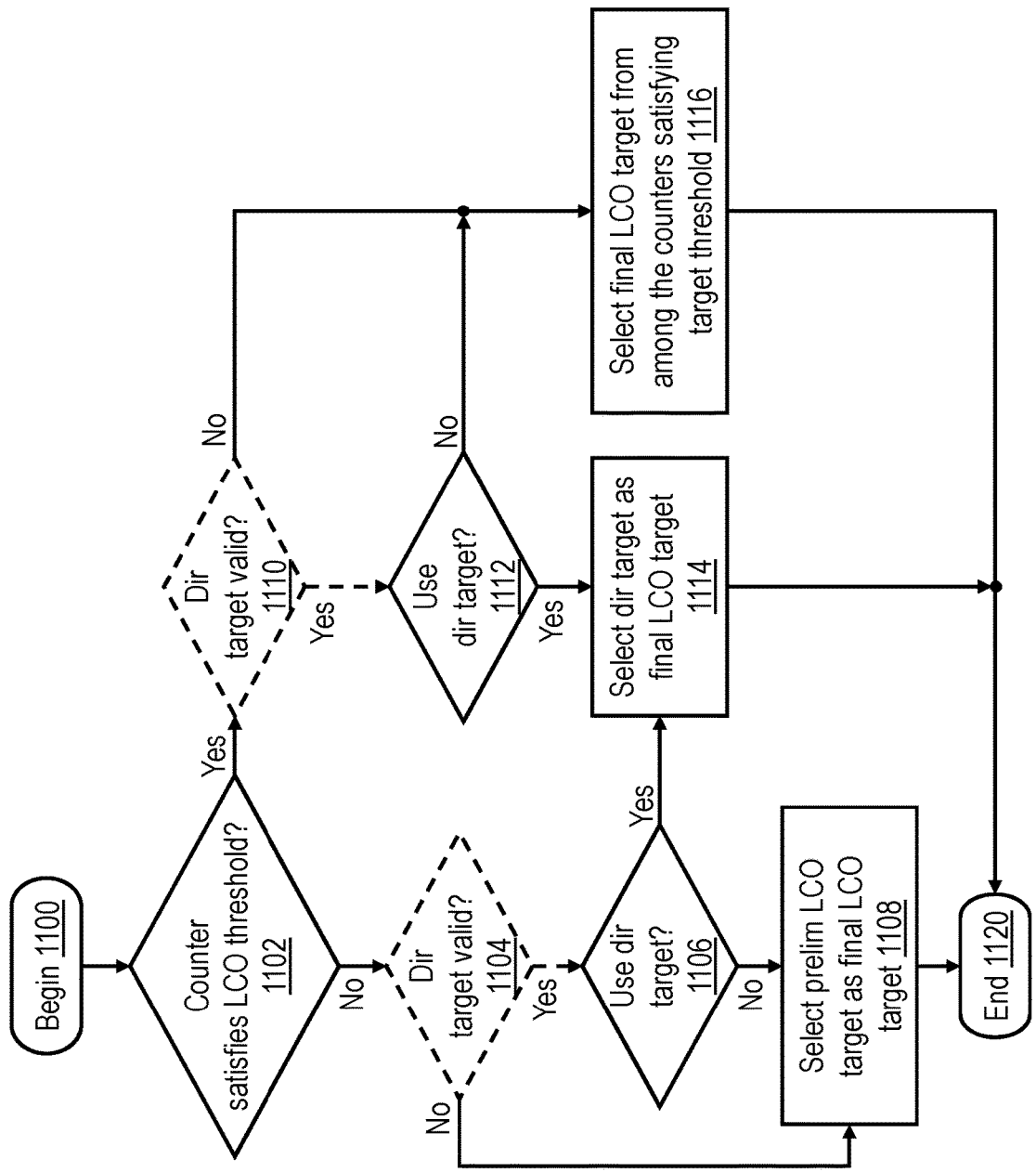
FIG. 11 is a high-level logical flowchart of an exemplary method by which a LCO logic selects a target of a LCO in accordance with one embodiment.

With reference now to FIG. 11, there is illustrated a high-level logical flowchart of an exemplary method by which LCO logic 405 selects a target of a LCO in accordance with one embodiment. The process of FIG. 11 begins at block 1100, for example, in response to the selection of a cache line held in L3 array 408 for eviction as discussed above. Following block 1100, the process proceeds to block 1102, which illustrates enhanced heuristic LCO logic 810 determining whether or not the value of any of counters 812a-812k satisfies (e.g., is greater than or equal to) a LCO threshold. This LCO threshold can be the same as that utilized at block 1002 of FIG. 10 or can be a lower count value. In response to an affirmative determination the process passes to block 1110, which is described below. If, however, a negative determination is made at block 1102, the process passes to block 1104.

Block 1104 is an optional block illustrating enhanced heuristic LCO logic 810 determining whether or not target valid field 508 in the directory entry 500 of the evicted cache line indicates target ID field 510 is valid. If not, or if optional block 1104 is omitted, the process passes to block 1108, which is described below. If, however, enhanced heuristic LCO logic 810 determines at block 1104 that target ID field 510 is valid, enhanced heuristic LCO logic 810 additionally may determine at block 1106 whether or not to use the specific targeting information provided by target ID field 510 or the more general targeting information provided by counters 812a-812k. For example, enhanced heuristic LCO logic 810 may make the illustrated determination based on workload characteristics, LCO frequency, pseudo-random selection, or other criteria. In response to a negative determination at block 1106, enhanced heuristic LCO logic 810 selects the L3 cache 232 identified by preliminary LCO target 804 as the target L3 cache 232 to receive a LCO and outputs the identity of the target L3 cache 232 on final LCO target signal 822 (block 1108). In response to an affirmative determination at block 1106, enhanced heuristic LCO logic 810 selects the L3 cache 232 identified by target ID field 510 as the target L3 cache 232 to receive a LCO and outputs the identity of the target L3 cache 232 on final LCO target signal 822 (block 1114). Following either of blocks 1108 or 1114, the process of FIG. 11 ends at block 1120.

Referring now to optional block 1110, enhanced heuristic LCO logic 810 determines whether or not target valid field 508 in the directory entry 500 of the evicted cache line indicates target ID field 510 is valid. If not, or if optional block 1110 is omitted, the process passes to block 1116, which illustrates enhanced heuristic LCO logic 810 selecting a target L3 cache 232 to receive the victim cache line via LCO from among the counters 812 that satisfy (e.g., greater than or equal to) a target threshold that is preferably lower than the LCO threshold employed at block 1002 in order to select from a range of caches, if any, near the LCO threshold. For example, at block 1116, the target L3 cache 232 can be selected based on the highest counter value within the set of counters 812 satisfying the target threshold, based on a pseudo-random or round robin selection from among the set of counters 812 satisfying the target threshold, or based on other additional and/or alternative criteria. Thereafter, the process ends at block 1120. If, however, enhanced heuristic LCO logic 810 determines at block 1110 that target ID field 510 is valid, enhanced heuristic LCO logic 810 additionally determines at block 1112 whether or not to use the specific targeting information provided by target ID field 510 or the more general targeting information provided by counters 812a-812k. In at least some embodiments, this determination can be independent of and can be made utilizing differing criteria than the similar determination depicted at block 1106. In response to a negative determination at block 1112, the process passes to block 1116, which has been described. Otherwise, the process proceeds to block 1114, which has also been described.

Figure 12:
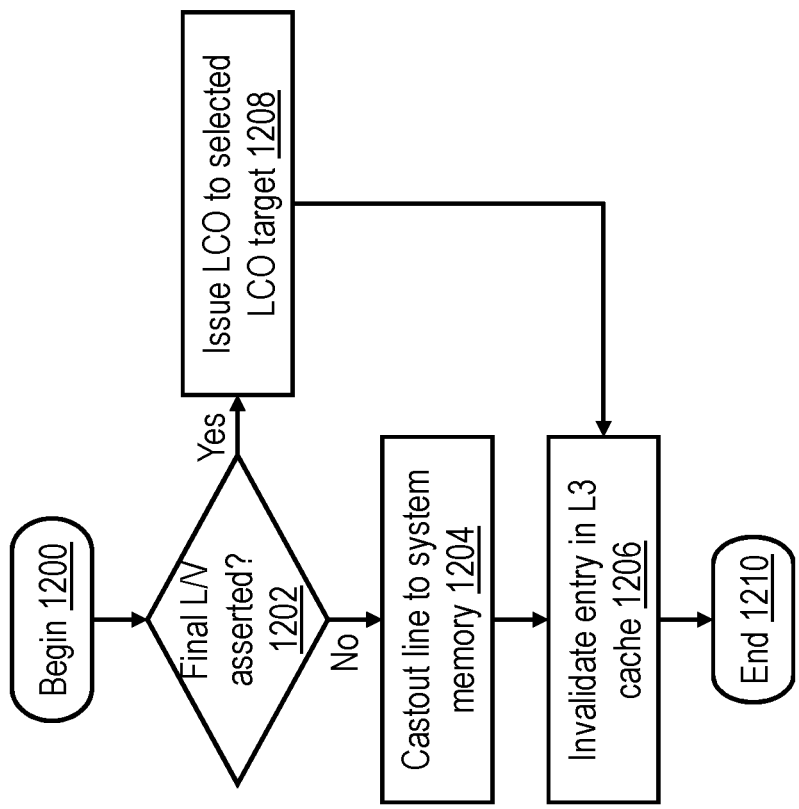
FIG. 12 is a high-level logical flowchart of an exemplary method by which a lower-level (e.g., L3) cache performs a castout in accordance with one embodiment.

Referring now to FIG. 12, there is depicted a high-level logical flowchart of an exemplary method by which a lower-level (e.g., L3) cache performs a castout in accordance with one embodiment. The process begins at block 1200 and then proceeds to block 1202, which illustrates a determination by a source L3 cache 232 whether final L/V signal 820 is asserted for a victim cache line evicted from L3 array 408 to indicate that a LCO should be performed. If so, the source L3 cache 232 issues, via the system fabric of data processing system 100, a LCO request to the target L3 cache 232 indicated by final LCO target signal 822 (block 1208). In response to acceptance of the LCO request by the target L3 cache 232 (as indicated, for example, by a coherence message), the source L3 cache 232 communicates a data tenure containing the victim cache line to the target L3 cache 232, which installs the cache line in its L3 array 408 as discussed above with reference to FIG. 6. Following block 1208, the source L3 cache 232 updates the state field 506 of the directory entry 500 in L3 directory 402 for the in victim cache line to an invalid coherence state (block 1206). The process of FIG. 12 then ends at block 1210.

Returning to block 1202, in response to a determination that final L/V signal 820 is not asserted, L3 cache 232 issues, via the system fabric of data processing system 100, a vertical castout of the victim cache line to the relevant memory controller 206 and system memory 108 (block 1204). Thereafter, the process of FIG. 12 passes to block 1204, which has been described.

Figure 13:
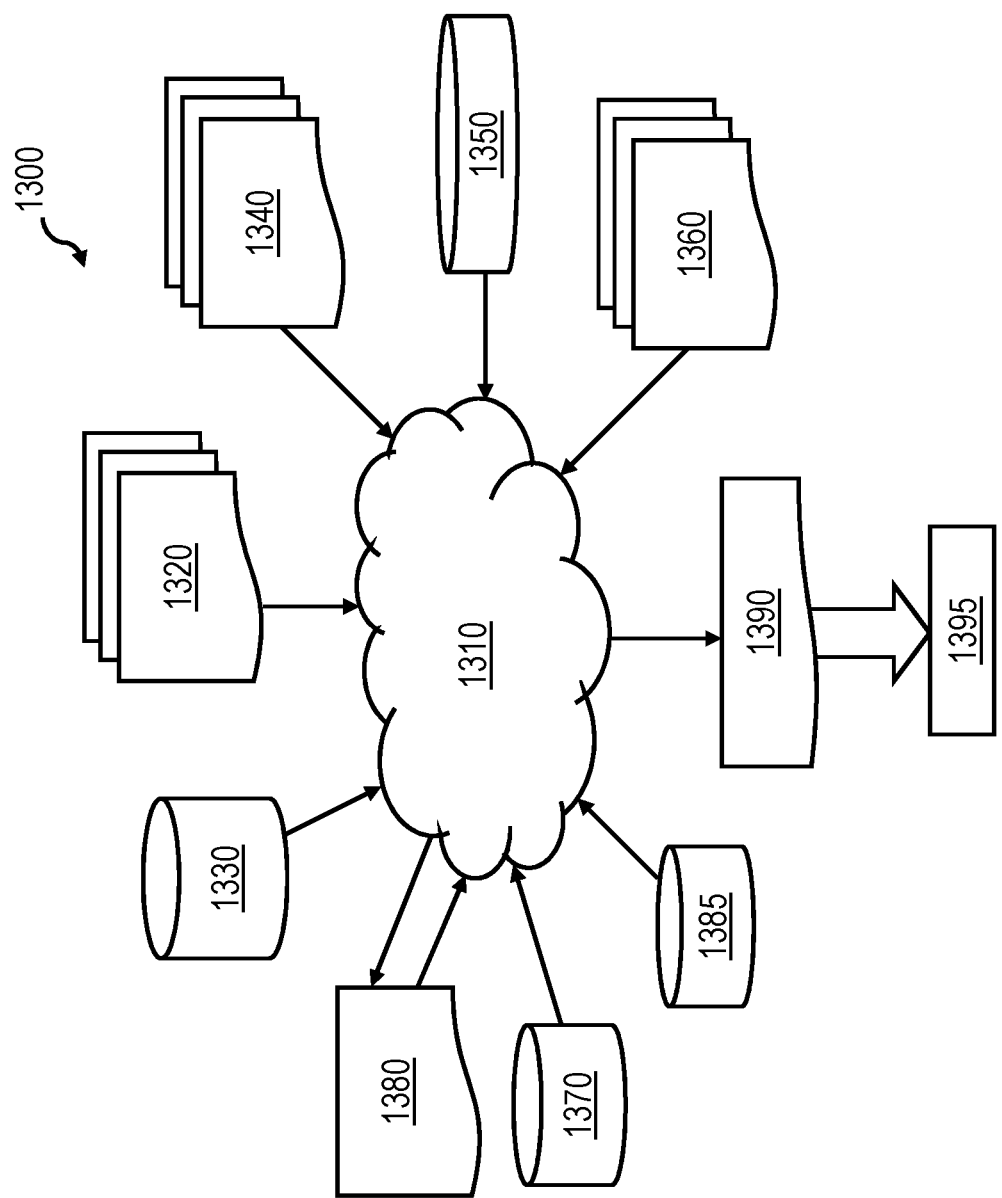
FIG. 13 is a data flow diagram illustrating a design process.

With reference now to FIG. 13, there is depicted a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices described above and shown herein. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1320 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system such as those shown herein. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures shown herein to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 5 nm, 7 nm, 10 nm, etc.). The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1390 may comprise a compiled, executable HDL simulation model that functionally simulates the devices shown herein.

Design structure 1390 may also employ a data format used for the exchange of layout data of integrated circuits and/or symbolic data format (e.g., information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1390 may then proceed to a stage 1395 where, for example, design structure 1390: proceeds to tape-out, is released to manufacturing, is released to a mask house, is sent to another design house, is sent back to the customer, etc.

As has been described, in at least one embodiment, a data processing system includes system memory and a plurality of processor cores each supported by a respective one of a plurality of vertical cache hierarchies. A first vertical cache hierarchy records information indicating communication of cache lines between the first vertical cache hierarchy and others of the plurality of vertical cache hierarchies. Based on selection of a victim cache line for eviction, the first vertical cache hierarchy determines, based on the recorded information, whether to perform a lateral castout of the victim cache line to another of the plurality of vertical cache hierarchies rather than to system memory and selects, based on the recorded information, a second vertical cache hierarchy among the plurality of vertical cache hierarchies as a recipient of the victim cache line via a lateral castout. Based on the determination, the first vertical cache hierarchy performs a castout of the victim cache line.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including system memory and a plurality of processor cores each supported by a respective one of a plurality of vertical cache hierarchies, the method comprising:
in a first vertical cache hierarchy among the plurality of vertical cache hierarchies, recording information indicating communication of cache lines between the first vertical cache hierarchy and others of the plurality of vertical cache hierarchies, said information including identification of a second vertical cache hierarchy among the plurality of vertical cache hierarchies with which the first vertical cache hierarchy has communicated a particular cache line;
based on selection of the particular cache line as a victim cache line for eviction from the first vertical cache hierarchy:
determining, based on the information, whether to perform a lateral castout of the victim cache line to another of the plurality of vertical cache hierarchies rather than to system memory;
selecting, based on the identification in the information, the second vertical cache hierarchy as a recipient of the victim cache line via the lateral castout; and
based on the determining, performing a castout of the victim cache line from the first vertical cache hierarchy.

2. The method of claim 1, wherein recording information includes recording the identification of the second vertical cache hierarchy based on receipt of the victim cache line by the first vertical cache hierarchy from the second vertical cache hierarchy.

3. The method of claim 1, wherein:
recording information includes maintaining a plurality of counters each associated with a respective other one of the plurality of vertical cache hierarchies, wherein a value of each of the plurality of counters reflects a relative number of cache lines communicated with the respective other one of the plurality of vertical cache hierarchies.

4. The method of claim 3, wherein the value of each of the plurality of counters reflects the relative number of cache lines received from and sent to the respective other one of the plurality of vertical cache hierarchies.

5. The method of claim 3, wherein the selecting includes:
determining whether any of the plurality of counters satisfies a lateral castout threshold; and
based on determining that none of the plurality of counters satisfies the lateral castout threshold, selecting the second vertical cache hierarchy randomly from among the plurality of vertical cache hierarchies.

6. The method of claim 3, wherein the selecting includes:
determining whether any of the plurality of counters satisfies a target threshold; and
based on determining that at least one of the plurality of counters satisfies the target threshold, selecting the second vertical cache hierarchy from among a set of vertical cache hierarchies associated with counters satisfying the target threshold.

7. The method of claim 3, wherein:
recording information includes recording the identification of the second vertical cache hierarchy based on receipt of the victim cache line by the first vertical cache hierarchy from the second vertical cache hierarchy;
the selecting includes:
determining whether any of the plurality of counters satisfies a lateral castout threshold; and
based on determining that at least one of the plurality of counters satisfies the lateral castout threshold, selecting the second vertical cache hierarchy based on the identification within the cache directory.

8. A processing unit for a data processing system including system memory and a plurality of processor cores each supported by a respective one of a plurality of vertical cache hierarchies, the processing unit comprising:
a first processor core among the plurality of processor cores;
a first vertical cache hierarchy among the plurality of vertical cache hierarchies, wherein the first vertical cache hierarchy is coupled to the first processor core and configured to be coupled to a system fabric of the data processing system, wherein the first vertical cache hierarchy includes a cache having a data array and a directory and is configured to perform:

recording information indicating communication of cache lines between the first vertical cache hierarchy and others of the plurality of vertical cache hierarchies, said information including identification of a second vertical cache hierarchy among the plurality of vertical cache hierarchies with which the first vertical cache hierarchy has communicated a particular cache line;

based on selection of the particular cache line as a victim cache line for eviction from the first vertical cache hierarchy:

determining, based on the information, whether to perform a lateral castout of the victim cache line to another of the plurality of vertical cache hierarchies rather than to the system memory;

selecting, based on the identification in the information, the second vertical cache hierarchy as a recipient of the victim cache line via the lateral castout; and based on the determining, performing a castout of the victim cache line from the first vertical cache hierarchy.

9. The processing unit of claim 8, wherein recording information includes recording the identification of the second vertical cache hierarchy based on receipt of the victim cache line by the first vertical cache hierarchy from the second vertical cache hierarchy.

10. The processing unit of claim 8, wherein:
the first vertical cache hierarchy includes a plurality of counters each associated with a respective other one of the plurality of vertical cache hierarchies; and
recording information includes maintaining in each of the plurality of counters a value reflecting a relative number of cache lines communicated with the respective other one of the plurality of vertical cache hierarchies.

11. The processing unit of claim 10, wherein the value of each of the plurality of counters reflects the relative number of cache lines received from and sent to the respective other one of the plurality of vertical cache hierarchies.

12. The processing unit of claim 10, wherein the selecting includes:
determining whether any of the plurality of counters satisfies a lateral castout threshold; and
based on determining that none of the plurality of counters satisfies the lateral castout threshold, selecting the second vertical cache hierarchy randomly from among the plurality of vertical cache hierarchies.

13. The processing unit of claim 10, wherein the selecting includes:
determining whether any of the plurality of counters satisfies a target threshold; and
based on determining that at least one of the plurality of counters satisfies the target threshold, selecting the second vertical cache hierarchy from among a set of vertical cache hierarchies associated with counters satisfying the target threshold.

14. The processing unit of claim 10, wherein:
recording information includes recording the identification of the second vertical cache hierarchy based on receipt of the victim cache line by the first vertical cache hierarchy from the second vertical cache hierarchy;
the selecting includes:
determining whether any of the plurality of counters satisfies a lateral castout threshold; and
based on determining that at least one of the plurality of counters satisfies the lateral castout threshold, selecting the second vertical cache hierarchy based on the identification within the cache directory.

15. A data processing system, comprising:
a plurality of processing units in accordance with claim 8;
the system fabric coupling the plurality of processing units; and
the system memory communicatively coupled to the system fabric.

16. A design structure tangibly embodied in a machine-readable storage medium for designing, manufacturing, or testing an integrated circuit, the design structure comprising:
a processing unit for a data processing system including system memory and a plurality of processor cores each supported by a respective one of a plurality of vertical cache hierarchies, the processing unit including:
a first processor core among the plurality of processor cores;
a first vertical cache hierarchy among the plurality of vertical cache hierarchies, wherein the first vertical cache hierarchy is coupled to the first processor core and configured to be coupled to a system fabric of the data processing system, wherein the first vertical cache hierarchy includes a cache having a data array and a directory and is configured to perform:
recording information indicating communication of cache lines between the first vertical cache hierarchy and others of the plurality of vertical cache hierarchies, said information including identification of a second vertical cache hierarchy among the plurality of vertical cache hierarchies with which the first vertical cache hierarchy has communicated a particular cache line;
based on selection of the particular cache line as a victim cache line for eviction from the first vertical cache hierarchy:
determining, based on the information, whether to perform a lateral castout of the victim cache line to another of the plurality of vertical cache hierarchies rather than to the system memory;
selecting, based on the identification of the information, the second vertical cache hierarchy among the plurality of vertical cache hierarchies as a recipient of the victim cache line via the lateral castout; and
based on the determining, performing a castout of the victim cache line from the first vertical cache hierarchy.

17. The design structure unit of claim 16, wherein recording information includes recording the identification of the second vertical cache hierarchy based on receipt of the victim cache line by the first vertical cache hierarchy from the second vertical cache hierarchy.

18. The design structure of claim 16, wherein:
the first vertical cache hierarchy includes a plurality of counters each associated with a respective other one of the plurality of vertical cache hierarchies; and
recording information includes maintaining in each of the plurality of counters a value reflecting a relative number of cache lines communicated with the respective other one of the plurality of vertical cache hierarchies.

19. The design structure of claim 18, wherein the value of each of the plurality of counters reflects the relative number of cache lines received from and sent to the respective other one of the plurality of vertical cache hierarchies.

20. The design structure of claim 16, wherein the design structure comprises a hardware description language (HDL) design structure.

\* \* \* \* \*